United States Patent
Fujii

[11] Patent Number: 5,119,917
[45] Date of Patent: Jun. 9, 1992

[54] GEAR KNOCKING SOUND PREVENTING DEVICE FOR TRANSMISSION

[75] Inventor: Isao Fujii, Shizuoka, Japan

[73] Assignee: Suzuki Jidosha Kogyo Kabushiki Kaisha, Shizuoka, Japan

[21] Appl. No.: 588,678

[22] Filed: Sep. 26, 1990

[30] Foreign Application Priority Data

Sep. 30, 1989 [JP] Japan ................. 1-256414

[51] Int. Cl.⁵ ..................... B60K 41/26; F16D 23/02
[52] U.S. Cl. ..................... 192/4 C; 74/339; 74/411.5
[58] Field of Search ........... 192/4 C; 74/411.5, 477, 74/339

[56] References Cited

U.S. PATENT DOCUMENTS

| | | | |
|---|---|---|---|
| 4,221,283 | 9/1980 | Nordkvist et al. ................. | 192/4 C |
| 4,467,665 | 8/1984 | Katayama et al. ................ | 192/4 C X |
| 4,601,214 | 7/1986 | Fukuchi ........................... | 192/4 C X |
| 4,745,824 | 5/1988 | Hiraiwa ............................ | 192/4 C X |

FOREIGN PATENT DOCUMENTS 57-137747  8/1982  Japan .

Primary Examiner—Rodney H. Bonck
Attorney, Agent, or Firm—Flynn, Thiel, Boutell & Tanis

[57] ABSTRACT

A gear knocking sound preventing device for a transmission having a rotatable main shaft and a forward stage low speed shift shaft, a forward stage high speed shift shaft, and a forward stage maximum speed and reverse shift shaft. These latter three shift shafts are selectively axially movable by actuation of a shift and select lever mounted on a shift and select shaft. A gear knocking sound preventing device is provided and includes a cam mechanism having a first cam disposed on the shift and select shaft, and a second cam disposed on the forward stage low speed shift shaft so as to be engagable and disengagable with the first cam. The first cam is activated by rotation of the shift and select shaft and is brought into engagement with the second cam during reverse shifting so that the forward stage low speed shift shaft is moved slightly axially to activate a forward stage synchronous meshing mechanism to thereby stop the rotation of the main shaft of the transmission.

12 Claims, 8 Drawing Sheets

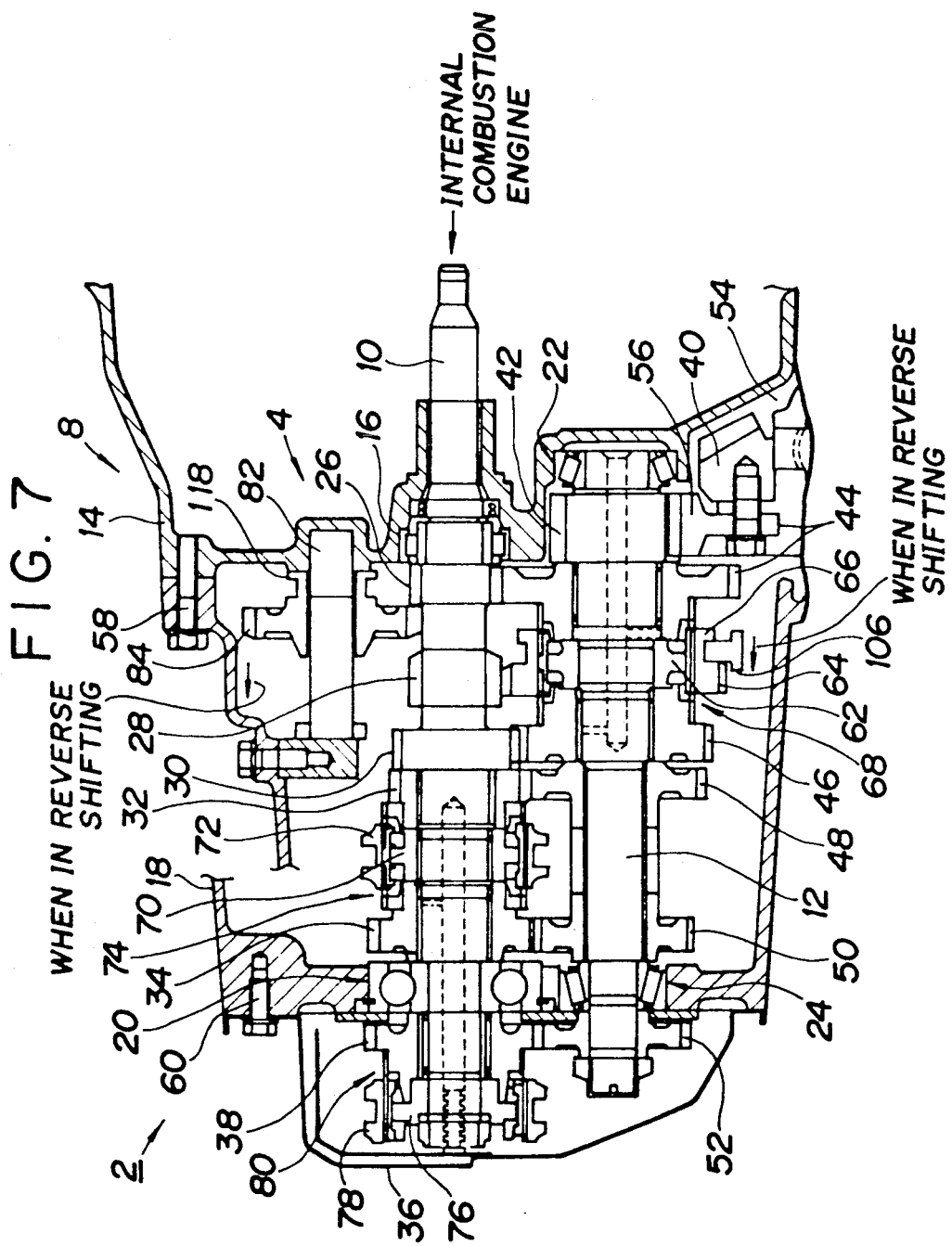

WHEN IN REVERSE SELECTING

WHEN IN REVERSE SHIFTING

GEAR KNOCKING SOUND PREVENTING DEVICE FOR TRANSMISSION

FIELD OF THE INVENTION

This invention relates to a gear knocking sound preventing device for a transmission which is capable of preventing generation of a gear knocking sound (i.e. gear squeak) when a reverse shift operation is performed by actuating a forward stage synchronous meshing mechanism irrespective of the speed of reverse shift operation.

BACKGROUND OF THE INVENTION

A vehicle is equipped with a transmission for converting driving force of an internal combustion engine installed thereon as a prime mover into a form meeting with traveling conditions so that the same can be taken off according to necessity. As for the transmission, there are known a gear type transmission, a belt type transmission and others. Among them, the gear type transmission is most commonly used because loss of the driving force is small. The gear type transmission has multi-stage speed change gear trains, and by shifting the gear trains such that gears of each stage are meshed with each other, the driving force of the internal combustion engine is converted into a form meeting with traveling conditions and taken off according to necessity.

Such gear transmission can be further classified into, for example, selective slide type, normally meshing type and others, which are classified according to the type for shifting a change gear ratio. The selective slide type has gears mounted on a main shaft connected to an input shaft on the side of an internal combustion engine, on a counter shaft arranged parallel to the main shaft, and on an idler shaft arranged parallel to the main shaft, with the gears on the idler shaft being slid to mesh with the gears on the main shaft and the gears on the counter shaft to transmit the driving force.

Similarly, in the normally meshing type, a pair of gears of those on a required number of speed change stages are normally meshed with each other. It is designed such that gears can be idly rotated in a space between a shaft and the gears. And a pair of gears able to obtain a required change gear ratio are fixed to the shaft by a connecting sleeve on the shaft in order to transmit torque.

Similarly, a known manual type transmission includes a wrong way operation preventing mechanism for preventing the gear from being shifted directly to reverse from the forward maximum speed position (5th speed to 4th speed), a gear squeak preventing mechanism for preventing the gear from generating a squeaking sound when shifted to reverse, and many others. An operation mechanism of such manual type transmission includes a shift and select shaft which is rotated when selecting, and which is moved in the axial direction when shifting, in accordance with the operating state of the shift lever. The operation mechanism has a forward stage low speed (1st-speed and 2nd-speed) shift shaft, a forward stage high speed (3rd-speed and 4th-speed) shift shaft, and a forward stage maximum speed and reverse (5th-speed and reverse) shift shaft. A shift and select lever mounted on the shift and select shaft is selectively actuated.

Furthermore, as a transmission for vehicles, there is one as disclosed in, for example, Japanese Patent Early Laid-open Publication No. 57-137747. The transmission disclosed in this Publication is designed such that a fork shaft of a forward stage is pushed when in reverse shifting, and a counter gear is synchronized with rotation of an output shaft by a synchronous meshing mechanism of a forward stage, thereby to easily obtain synchronism for shifting the gear to reverse and to smoothly shift the gear without generating a gear squeak when in reverse shifting.

In the conventional selective slide type gear transmission, the shift and select lever mounted on the shift and select shaft is swung when in reverse shifting, and a 5th-speed and reverse yoke as a forward stage maximum speed and reverse yoke is slidably moved by the actuation of the shift and select lever. Then the 5th-speed and reverse shift shaft as a forward stage maximum speed and reverse shift shaft is moved in the axial direction to cause a reverse idler arm to be slidably moved, a reverse idler lever being actuated by the movement of the reverse idler arm, a reverse idler gear being brought into meshing contact with a main reverse gear mounted on the main shaft and with a counter reverse gear mounted on the counter shaft by the actuation of the reverse idler lever, thereby to perform the reverse shifting.

However, it has such an inconvenience in that when the reverse idler gear is moved to the main reverse gear side, the reverse idler gear is brought into meshing contact with the main reverse gear and with the counter reverse gear while the main shaft is being rotated, and therefore the gears are not smoothly meshed with each other, thus generating a gear knocking sound (i.e. gear squeak or grinding).

Therefore, a known knocking sound preventing device, in order to eliminate the above-mentioned inconvenience, is provided with a pin and a spring for energizing the pin so that the synchronous meshing mechanism of a forward stage is actuated when in reverse shifting and the main shaft is stopped rotating before the reverse idler gear is meshed with the main reverse gear and with the counter reverse gear in order to prevent generation of the gear knocking sound. Because an operating force for activating the synchronous meshing mechanism has a certain relation with a repulsive force (energizing force) of the spring, it becomes difficult to positively actuate the synchronous meshing mechanism when the speed becomes high at the reverse shift operation, thus resulting in generation of the gear knocking sound.

To overcome the above-mentioned inconvenience, the present invention provides a gear knocking sound preventing device for a transmission which, in a slide selective type gear transmission, is designed such that a forward stage low speed shift shaft is slightly moved in the axial direction in association with the actuation of a shift and select shaft when in reverse shifting. In other words, a forward stage fork and a forward stage shifting sleeve are slightly moved to actuate a forward stage synchronous meshing mechanism, whereby said forward stage synchronous meshing mechanism is positively and surely actuated by means of said forward stage sleeve moved by said forward stage fork, and rotation of the main shaft is stopped before the reverse idler gear is meshed with the main reverse gear irrespective of the speed of the reverse shifting operation, so that said reverse idler gear can be smoothly meshed with said main reverse gear and generation of a gear knocking sound can be prevented.

To achieve the above, in a transmission including a forward stage low speed shift shaft, a forward stage high speed shaft, and a forward stage maximum speed and reverse shift shaft selectively moved in the axial direction or rotated by actuation of a shift and select lever mounted on a shift and select shaft, the present invention provides a gear knocking sound preventing device which is characterized in that it further includes a cam mechanism having a first cam disposed on said shift and select shaft, and a second cam disposed on said forward stage low speed shift shaft so that said second cam can be engaged with and disengaged from said first cam, said first cam being activated in accordance with rotation of said shift and select shaft and being brought into engagement with said second cam when in reverse shifting so that said forward stage low speed shift shaft is slightly moved in the axial direction to activate a forward stage synchronous meshing mechanism.

According to the construction of the invention as briefly described above, when the shift and select shaft is rotated to perform a reverse shifting, the first cam is pivoted to engage with the second cam, the forward stage low speed shift shaft is slightly moved in the axial direction through the second cam, the forward stage synchronous meshing mechanism is actuated by the axial movement of the forward stage low speed shift shaft through the forward stage fork and the forward stage shifting sleeve, and the rotation of the main shaft is stopped before the reverse idler gear is meshed with the main reverse gear. As a result, even if the speed of a reverse shifting operation becomes high, the forward stage synchronous meshing mechanism is surely actuated and the reverse idler gear is smoothly meshed with the main reverse gear, thus enabling the gear knocking sound to be avoided.

BRIEF DESCRIPTION OF THE DRAWINGS

The embodiment of the present invention will be described hereunder in detail with reference to the drawings, in which:

FIG. 7 is a sectional view of a gear portion of the transmission;

DETAILED DESCRIPTION

Figure 1:
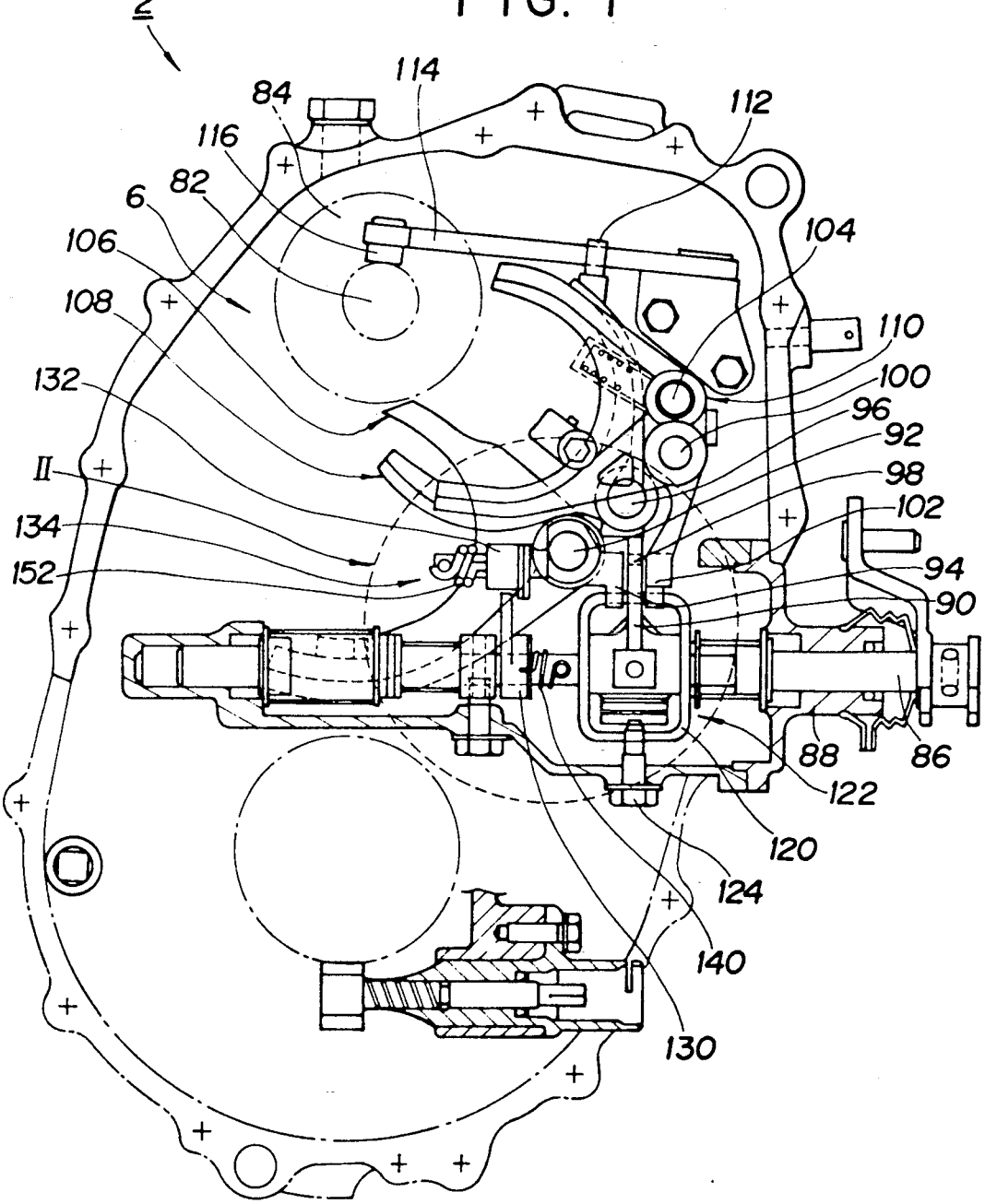
FIG. 1 is an elevational view of a gear change operating portion of a transmission according to the invention.
Figure 4:
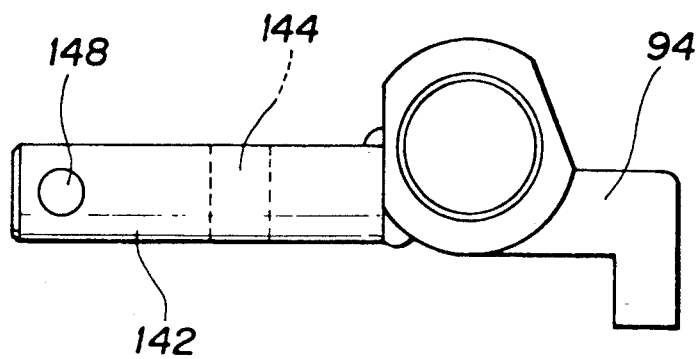
FIG. 4 is a side view of a 1st-speed and 2nd-speed yoke connected with a cam shaft.
Figure 5:
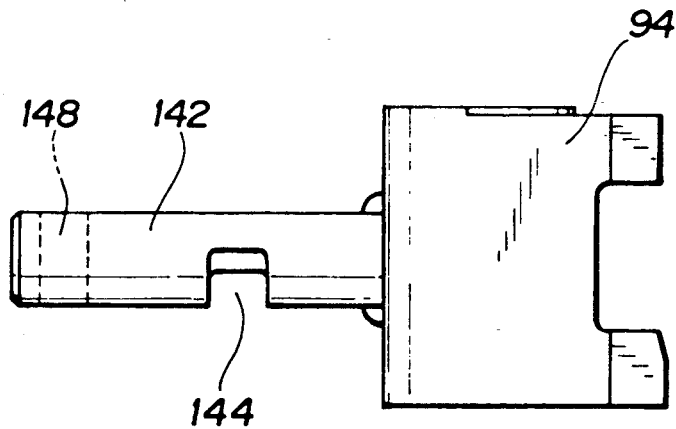
FIG. 5 is a plan view of the 1st-speed and 2nd-speed yoke connected with the cam shaft.
Figure 6:
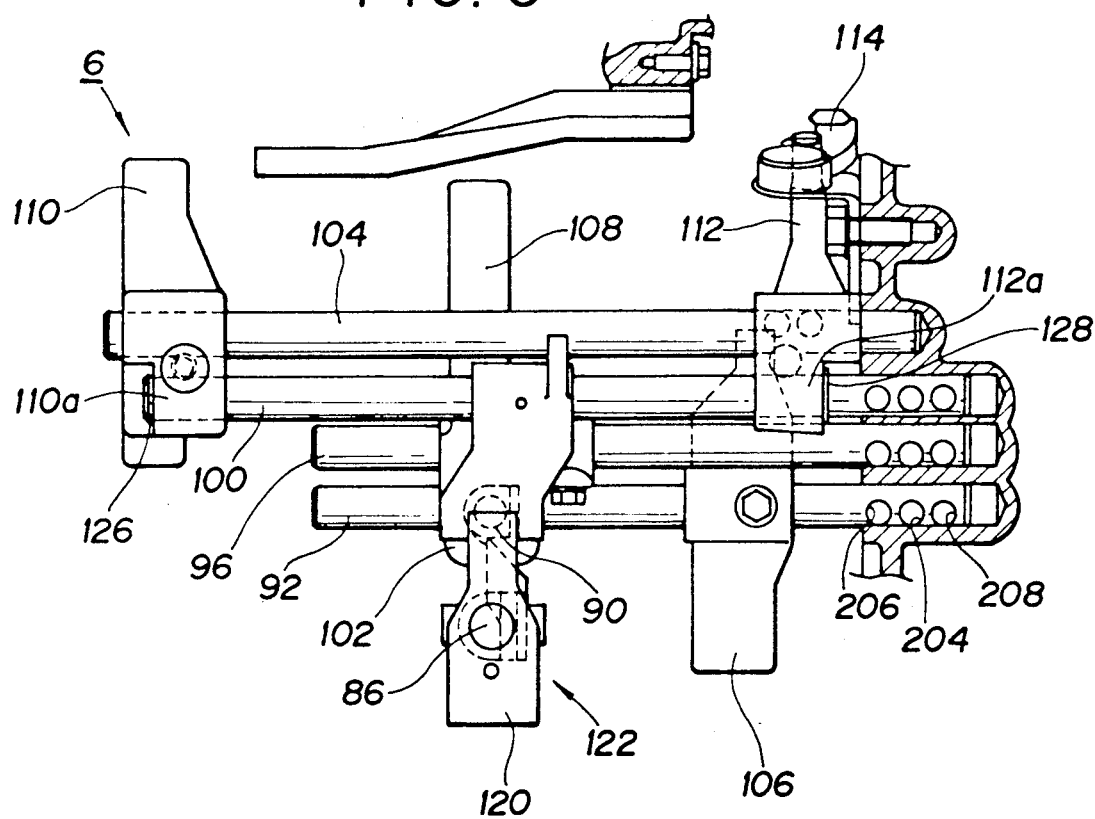
FIG. 6 is a side view of the gear change operating portion.

FIGS. 1 through 11 show an embodiment of the present invention. In FIGS. 1, 6 and 7, the numeral 2 denotes a selective slide type gear transmission (hereinafter simply referred to as the "transmission"), 4 a gear portion, 6 a change gear operating portion, and 8 a transmission case. Within this transmission case 8, a main shaft 10 communicating with an input shaft (not shown) for inputting power from an internal combustion engine side, and a counter shaft 12 are rotatably supported in the longitudinal direction of and parallel to the transmission 2.

As shown in FIG. 7, the main shaft 10 is rotatably carried on a first main shaft bearing 16 held by a right case 14 of the transmission case 8 and on a second main shaft bearing 20 held by a left case 18 of the transmission case 8.

The counter shaft 12 is rotatably carried on a first counter shaft bearing 22 held by the right case 14 and on a second counter shaft bearing 24 held by the left case 18.

The main shaft 10 is provided with a main 1st-speed gear 26, a main reverse gear 28, and a main 2nd-speed gear 30 fixed thereon in this order from the internal combustion engine side. The main shaft 10 is further provided with a main 3rd-speed gear 32, a main 4th-speed gear 34, and a main 5th-speed gear 38 acting as a main forward stage maximum speed gear within a side case 36 of the transmission case 8, which latter gears are all rotatably mounted on the main shaft 10.

The counter shaft 12 is provided, in the order from the internal combustion engine side, with a final drive gear 42 forming a final reduction mechanism 40, the gear 42 being fixedly mounted on the shaft 12, a counter 1st-speed gear 44 with which the main 1st-speed gear 26 is to be meshed and a counter 2nd-speed gear 46 with which the main 2nd-speed gear 30 is to be meshed, the gears 44 and 46 being rotatably mounted on the shaft 12, and further with a counter 3rd-speed gear 48 with which the main 3rd-speed gear 32 is to be meshed, a counter 4th-speed gear 50 with which the main 4th-speed gear 34 is to be meshed, and a counter 5th-speed gear 52 acting as a counter forward stage maximum speed gear within the side case 36, the gears 48, 50 and 52 being fixedly mounted on the shaft 12. The counter 5th-speed gear 52 is adapted to mesh with the main 5th-speed gear 38.

The final drive gear 42 is meshed with the driven gear 56 of a differential portion 54.

The right case 14 and the left case 18 are connected with each other by screws 58, while the left case 18 and the side case 36 are connected with each other by screws 60.

The counter shaft 12, between the gears 44 and 46, is provided with a 1st-speed and 2nd-speed hub 62 fixedly mounted thereon. Integrally mounted on the hub 62 are counter reverse gear 64 and a 1st-speed and 2nd-speed shifting sleeve 66 for movement in the axial direction of the counter shaft 12. This 1st and 2nd speed shifting sleeve 66 is adapted to actuate a forward stage 1st-speed and 2nd-speed synchronous meshing mechanism 68 having a 1st-speed and 2nd-speed synchronizer ring.

Also, the main shaft 10, between the gears 32 and 34, is provided with a 3rd and 4th speed hub 70 fixedly mounted thereon. The hub 70 is provided with a 3rd and 4th speed shifting sleeve 72 for movement in the axial direction of the main shaft 10. This shifting sleeve 72 is adapted to actuate a forward stage 3rd-speed and 4th-speed synchronous meshing mechanism 74 having a 3rd-speed and 4th-speed synchronizer ring.

Further more, within the side case 36, the main shaft 10 is provided with a 5th-speed hub 76 fixedly mounted thereon and the 5th-speed hub 76 is provided with a 5th-speed shifting sleeve 78 acting as a forward stage maximum speed shifting sleeve which is moved in the axial direction of the main shaft 10 so as to be engaged with and disengaged from the main 5th-speed gear 38. This shifting sleeve 78 is adapted to actuate a forward stage 5th-speed synchronous meshing mechanism 80 having a 5th-speed synchronizer ring.

Also held on the right case 14 and the left case 18 is a reverse idler shaft 82 which is disposed parallel to the main shaft 10 and the counter shaft 12. The reverse idler shaft 82 is provided with a reverse idler gear 84. The reverse idler gear 84 is adapted to move in the axial direction of the reverse idler shaft 82 so as to be engaged with and disengaged from the main reverse gear 28 and the counter reverse gear 64.

Within the transmission case 8, a shift and select shaft 86 (FIG. 1) is mounted on the gear change operating portion 6 such that the shaft 86 is moved in the axial direction when selecting and is rotated when shifting. One end of the shift and select shaft 86 is supported by a holding portion 88 connected to the transmission case 8 and the other end thereof is connected to a control shaft (not shown). That is, the shift and select shaft 86 is moved in the axial direction because the control shaft is moved when an operator operates a shift lever (not shown) in the select direction, and the shaft 86 is rotated because the control shaft is moved when the operator operates the shift lever in the shift direction.

Figure 2:
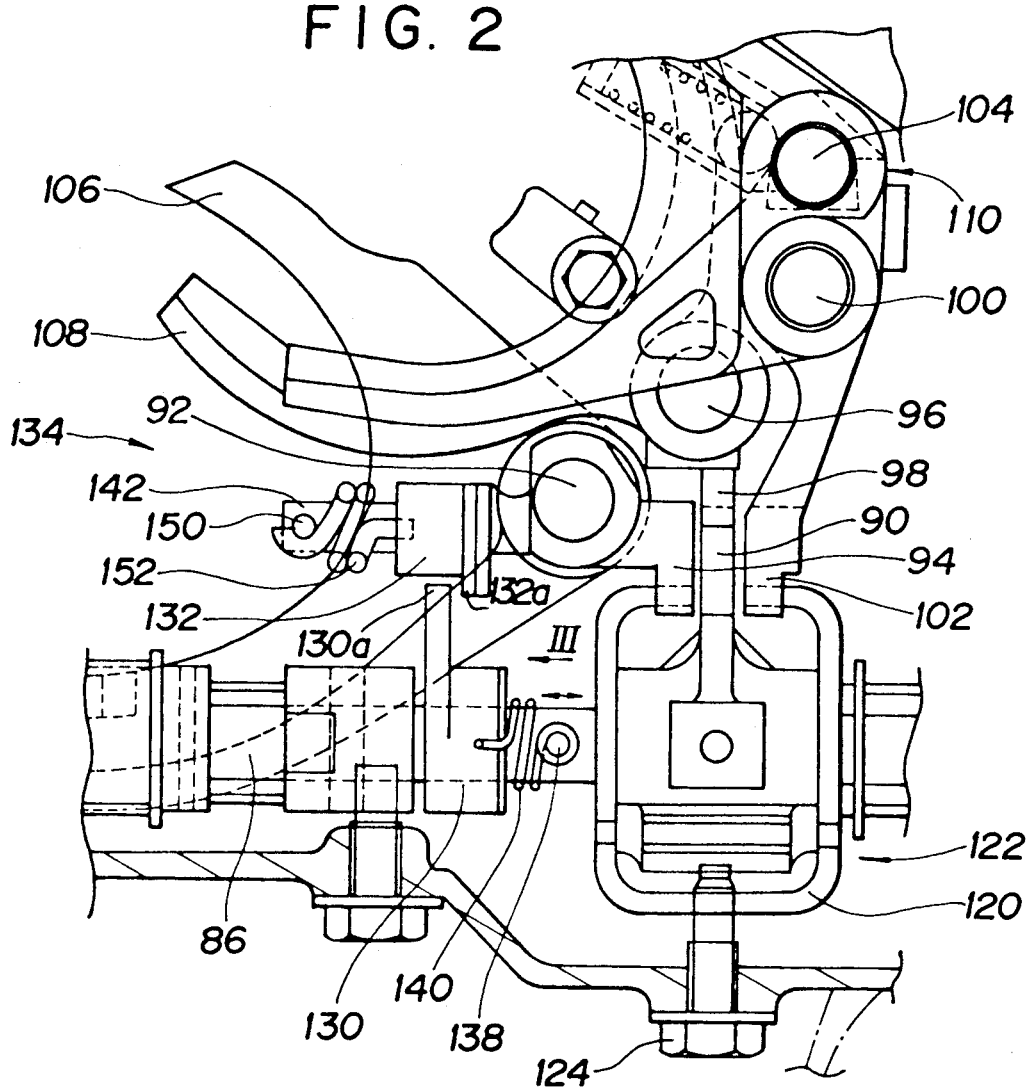
FIG. 2 is an enlarged view of a cam mechanism shown by arrow II of FIG. 1.

This shift and select shaft 86 is provided with a shift and select lever 90 (FIGS. 1, 2, 6).

In accordance with the movement of the shift and select shaft 86 in one axial direction (leftward movement in FIGS. 1 and 2), the shift and select lever 90 is selectively engaged with a 1st and 2nd speed shift yoke 94 connected to a 1st and 2nd speed shift shaft 92 acting as a forward stage low speed shift shaft. When lever 90 is in the center position as shown, lever 90 is engaged with a 3rd and 4th speed shift yoke 98 connected to a 3rd and 4th speed shift shaft 96 acting as a forward stage high speed shift shaft. When shaft 86 is shifted rightwardly, lever 90 is engaged with a 5th speed and reverse shift yoke 102 connected to a 5th speed and reverse shift shaft 100.

Figure 8A:
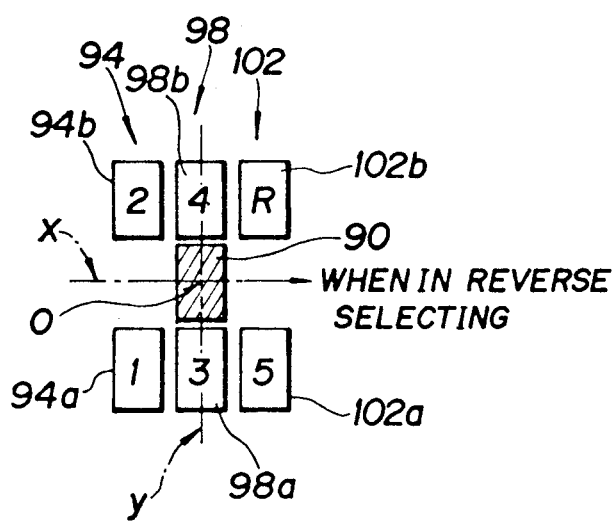
FIG. 8(a) is an explanatory view showing a positional relation between a shift and select lever and various yokes before reverse shifting is performed.

As is shown in FIG. 8(a), the 1st and 2nd speed shift yoke 94 comprises a 1st-speed yoke portion 94a and a 2nd-speed yoke portion 94b which are arranged in symmetric relation with each other with respect to the center line x in the select direction. Similarly, the 3rd and 4th speed shift yoke 98 comprises a 3rd-speed yoke portion 98a and a 4th-speed yoke portion 98b which are arranged in a symmetric relation with each other with respect to the center line x in the select direction. Furthermore, the 5th-speed and reverse shift yoke 102 comprises a 5th-speed yoke portion 102a and a reverse yoke portion 102b which are arranged in a symmetric relation with respect to the center line x in the select direction.

Also as shown in FIG. 8(a), the center of the shift and select lever 90, when in neutral, is located at the point O of intersection between a shift direction center line y and the select direction center line x.

A 5th-speed and reverse guide shaft 104 for holding a 5-speed fork 110 and a reverse idler arm 112 as will be described later is disposed in parallel relation with the 5th-speed and reverse shift shaft 100.

The transmission 2 is constructed such that by actuation of the shift and select lever 90, the 5th-speed and reverse shift shaft 100 is moved to one side in the axial direction in order to move the 5th-speed sleeve 78 to the main 5th-speed gear 38 side and the 5th-speed and reverse shift shaft 100 is moved to the other side in the axial direction in order to move the reverse idler gear 84 to the main reverse gear 28 side.

As is shown in FIGS. 1 and 7, the 1st and 2nd speed shift shaft 92 is provided with a 1st and 2nd speed fork 106 adapted to engage with the 1st and 2nd speed shift sleeve 66, while the 3rd and 4th speed shift shaft 96 is provided with a 3rd and 4th speed fork 108 adapted to engage with the 3rd and 4th speed shift sleeve 72.

One end of the 5th-speed and reverse shift shaft 100 is provided with a 5th-speed fork 110 adapted to engage with the 5th-speed shift sleeve 78 and slidable with respect to the 5th-speed and reverse shift shaft 100, and the other end thereof is provided with a reverse idler arm 112. The reverse idler arm 112 is adapted to hold a reverse shift lever 114. A reverse shift fork 116 disposed on a front end portion of the reverse shift lever 114 is in engagement with a reverse sleeve 118 of the reverse idler gear 84. Accordingly, by the actuation of the reverse idler arm 112, the reverse shift lever 114 is oscillated and by the oscillation of this reverse shift lever 114, the reverse idler gear 84 is moved on the reverse idler shaft 82 in such a manner as to be engaged with and disengaged from the main reverse gear 28 and the counter reverse gear 64.

Also, the shift and select shaft 86 is provided with an interlock mechanism 122 having an interlock plate 120 for preventing wrong way shifting. The interlock plate 120 is held by a plate supporting bolt 124 and moved only in the axial direction of the shift and select shaft 86.

The 5th-speed and reverse shift shaft 100 is provided with a first collar portion 126 which is abutted against a side surface of a fork abutting portion 110a of the 5th-speed fork 110 to move the 5th-speed fork 110 to the right-hand side in FIG. 6 when the 5th-speed and reverse shift shaft 100 is moved to the right-hand side in order to shift to 5th-speed, and with a second collar portion 128 which is abutted against a side surface of an arm abutting portion 112a of the reverse idler arm 112 to move the reverse idler arm 112 to the left-hand side in FIG. 6 when the 5th-speed and reverse shift shaft 100 is moved to the left-hand side in order to shift to reverse.

To prevent generation of a gear knocking sound (gear squeak) when in reverse shifting, the transmission 2 is provided with a cam mechanism 134 for simultaneously actuating the 1st and 2nd speed synchronous meshing mechanism 68. The cam mechanism 134 includes a first cam 130 disposed on the shift and select shaft 86 and a second cam 132 disposed on the 1st and 2nd speed shift shaft 92. Cam 132 is disposed so as to be engaged with and disengaged from the first cam 130 and adapted to slightly move the 1st and 2nd speed shift shaft 92 in the axial direction. The first cam 130 is actuated in accordance with rotation of the shift and select shaft 86 so as to engage the second cam 132 when in reverse shifting.

The first cam 130 is mounted on the shift and select shaft 86 with its cam portion 130a directed toward the 1st and 2nd speed shift shaft 92 and with its mounting pin 136 engaged in a pin groove 137 (FIG. 8b) and a groove in the shaft 86. The first cam 130 is energized by a return spring 140 attached to a fixing pin 138 fixed to the shift and select shaft 86.

Figure 3:
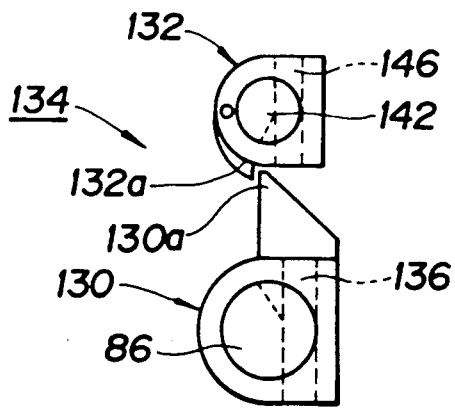
FIG. 3 is a front view of the cam mechanism shown by arrow III of FIG. 2.

The second cam 132, as shown in FIGS. 3, 4 and 5, is mounted on a cam shaft 142 by a second mounting pin 146 which is movably engaged in a second pin groove 144 formed on the cam shaft 142. This shaft 142 is connected to the 1st and 2nd-speed yoke 94 and extends in a generally parallel relation with the shift and select shaft 86. A cam portion 132a of the second cam 132 projects outwardly so as to be engaged with and disengaged from the cam portion 130a of the first cam 130. The second cam 132 is energized by a return spring 152 attached to a fixing pin 150 fixed to a pin fitting hole 148 of the cam shaft 142. Also, leftward movement of the second cam 132 in FIG. 3 is stopped by a stopper (not shown) after a predetermined amount of movement.

The mounting grooves in shafts 86 and 142 respectively receive mounting pins 136 and 146 of the cams 130 and 132, and are large enough to allow some limited movement of the pins 136 and 146 therein in order to permit rotational movement of the cams 130 and 132 relative to the respective shafts 86 and 142, as discussed below.

OPERATION

Figure 8B:
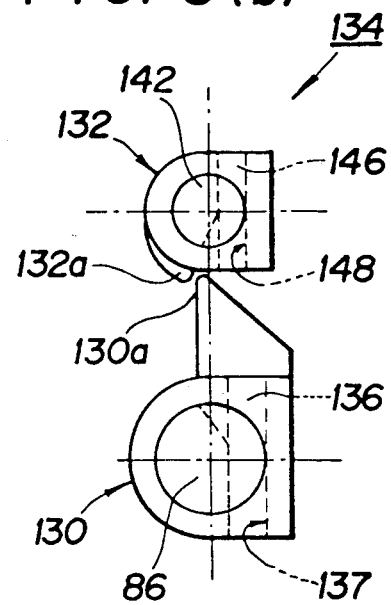
FIG. 8(b) is an explanatory view of the cam mechanism before reverse shifting is performed.

FIGS. 8(a) and 8(b) show the state before reverse shifting is performed, i.e., the state when in a neutral position. As shown in FIG. 8(a), the shift and select lever 90 is disposed between the 3rd-speed yoke portion 98a and the 4th-speed yoke portion 98b. Also at this time, as shown in FIG. 8(b), the cam portion 130a of the first cam 130 and the cam portion 132a of the second cam 132 are disengaged from each other.

Figure 9A:
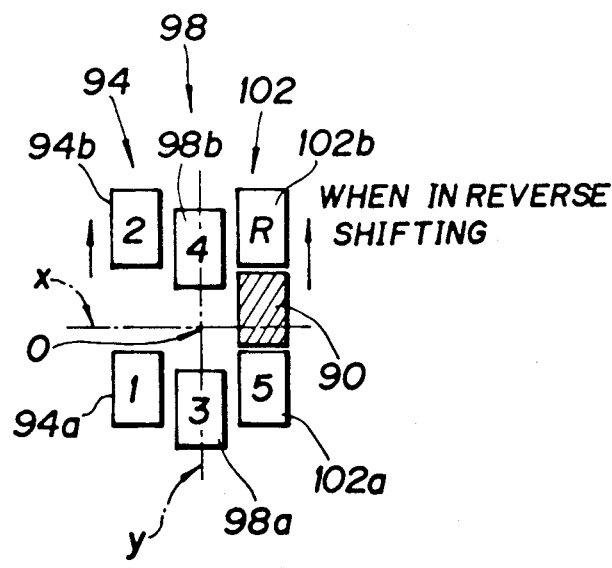
FIG. 9(a) is an explanatory view showing a positional relation between the shift and select lever and the various yokes at the time when reverse shifting is started.
Figure 9B:
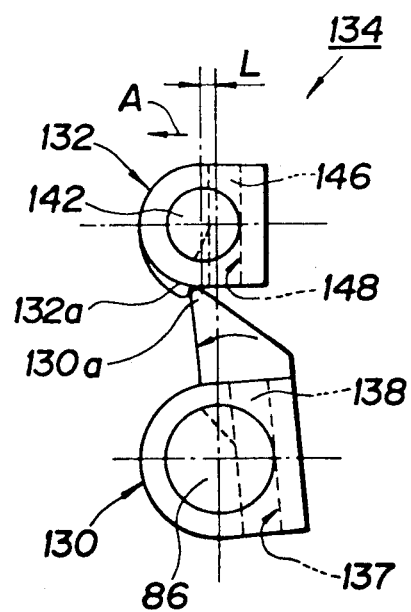
FIG. 9(b) is an explanatory view of the cam mechanism at the time when reverse shifting is started.

When reverse shifting is performed from the above-mentioned state, first the shift and select shaft 86 is moved in the axial direction to move the shift and select lever 90 to the 5th-speed and reverse yoke 102 side. As is shown in FIG. 9(a), when the shift and select lever 90 is placed between the 5-speed yoke portion 102a and the reverse yoke portion 102b and then the shift and select shaft 86 is initially rotated to effect shifting, the first cam 130 as shown in FIG. 9(b) is rotated to bring the cam portion 130a into contact with the cam portion 132a of the second cam 132, and the second cam 132 is axially moved by a distance L in the direction shown by arrow A. As a result, the 1st and 2nd speed yoke 94 is actuated in the same manner as the 5th-speed and reverse yoke 102 (shown in FIG. 9(a)), and the 1st and 2nd speed synchronous meshing mechanism 68 is engaged by the fork 106 and thus moves the 2nd-speed synchronizer ring. Owing to the actuation of the 1st and 2nd speed synchronous meshing mechanism 68, a braking or retarding force for stopping the rotation of the main shaft 10 is applied and the rotation of the main shaft 10 is stopped.

Figure 10A:
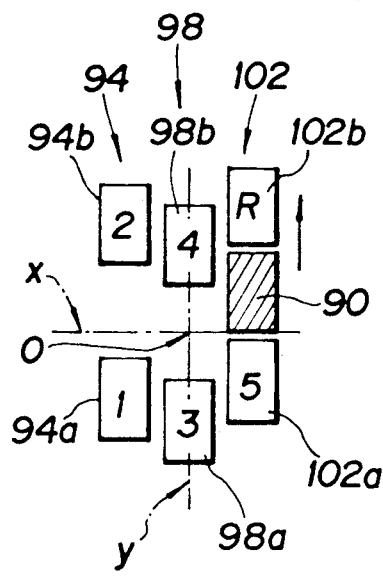
FIG. 10(a) is an explanatory view showing a positional relation between the shift and select lever and the various yokes before reverse shifting is completed.
Figure 10B:
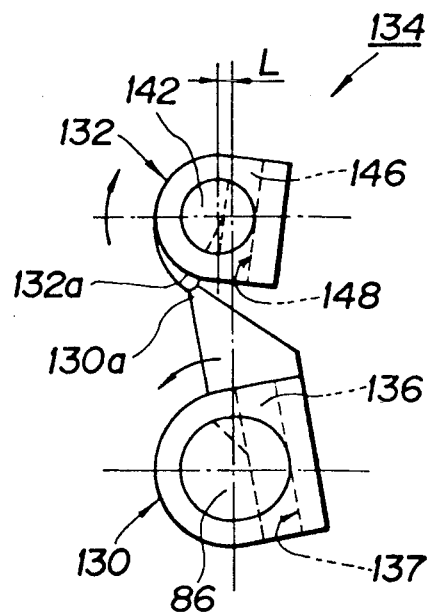
FIG. 10(b) is an explanatory view of the cam mechanism before reverse shifting is completed.

When the shift and select shaft 86 is further rotated, the 5th-speed and reverse yoke 102 is further moved toward the reverse yoke portion 102b as shown in FIG. 10(a). At this time, axial movement of the second cam 132 in the direction A is stopped by a stopper (not shown), but the cam 132 is rotated as shown in FIG. 10(b), because the first cam 130 keeps rotating.

Figure 11A:
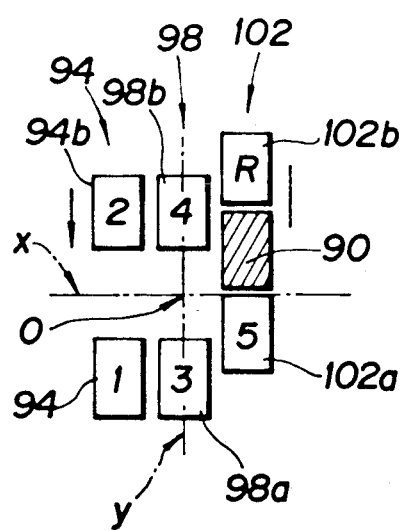
FIG. 11(a) is an explanatory view showing a positional relation between the shift and select lever and the various yokes at the time when reverse shifting has been completed.
Figure 11B:
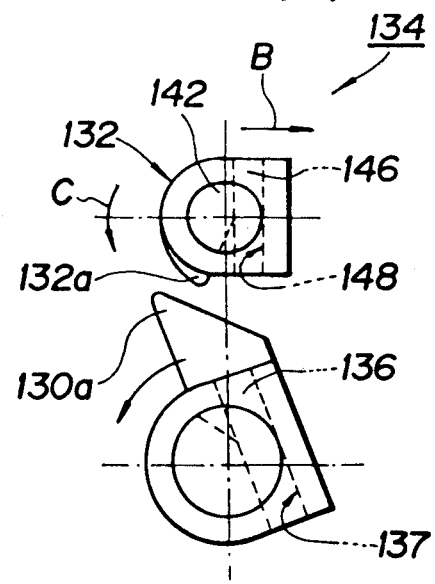
FIG. 11(b) is an explanatory view of the cam mechanism at the time when reverse shifting has been completed.

When the shift and select shaft 86 is further rotated, the 5th-speed reverse yoke 102 is further moved to complete the reverse shifting as shown in FIG. 11(a). At this time, the first cam 130 keeps rotating owing to rotation of the shift and select shaft 86, and the cam portion 130a of the first cam 130 eventually becomes disengaged from the cam portion 132a of the second cam 132. However, the second cam 132 is returned to its original rotational position (as shown by arrow C in FIG. 11(b)), due to the second return spring 152.

Figure 12:
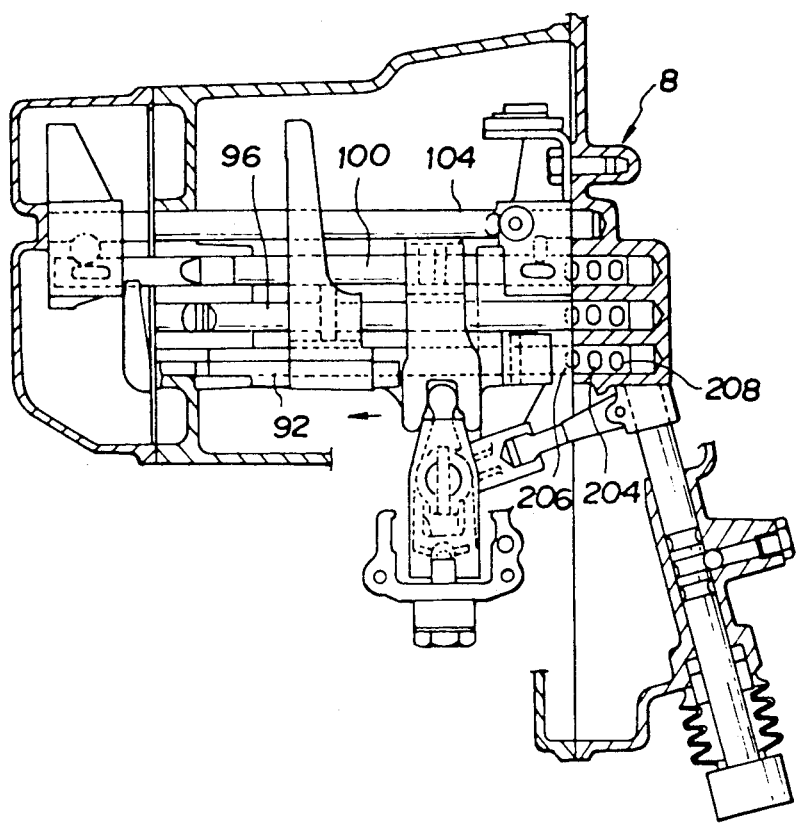
FIG. 12 illustrates a shaft return mechanism used in the present invention.
Figure 12A:
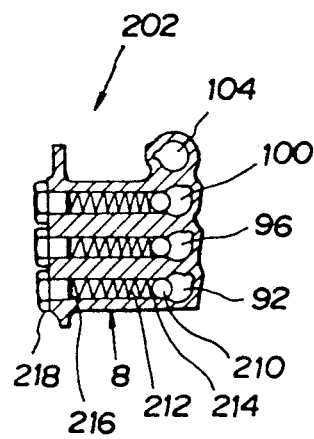
FIG. 12A is a sectional right side view of a part of FIG. 12.
Figure 13:
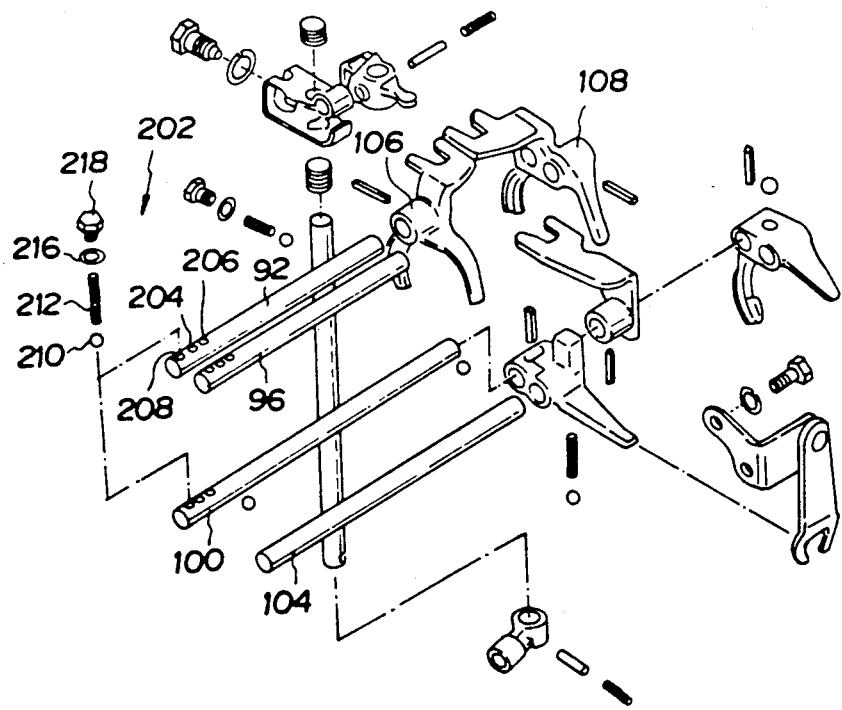
FIG. 13 is an exploded perspective view of the shaft return mechanism of FIG. 12.

At that time, the first-speed and second-speed shift shaft 92 and the first-speed and second-speed yoke 94 are returned to their original positions by a wrong operation preventing mechanism 202 illustrated in FIGS. 12, 12A and 13.

This wrong operation preventing mechanism 202 is conventional. That is, as shown in FIGS. 12, 12A and 13, one end portion of the first-speed and second-speed shift shaft 92 is provided with a neutral hole 204, a first-speed hole 206 and a second-speed hole 208 all arranged along the axial direction of the shaft.

When in neutral, the ball 210 is urged by the spring 212 and caused to be engaged in the neutral hole 204.

When in neutral, the ball 210 is urged by the spring 212 and caused to be engaged in the neutral hole 204. The ball 210 and spring 212 are stored in the storage hole 214 of the transmission case 8. When the first-speed and second-speed shift shaft 92 is moved in the axial direction toward the second-speed side, the ball 210 is moved slightly out toward the second-speed hole 208 from the neutral hole 204. However, the ball 210 does not fully come out of the neutral hole 204. When the second cam 132 disengages from the first cam 130 and is returned to its original position by the biasing force of the spring 152, the axial force applied by the cam mechanism 134 to the first-speed and second-speed shift shaft 92 is removed. As a result, the ball 210 is re-engaged in the neutral hole 204 by the urging force of the spring 212, and the first-speed and second-speed shift shaft 92 is returned to its original position. That is, the first-speed and second-speed shift shaft 92 is slightly moved in the right-hand direction in FIG. 6 and the first-speed and second-speed yoke 94 is returned to its original position together with the first-speed and second-speed shaft 92. Of course, this also causes corresponding movement of the cam shaft 142 and cam 132 in the direction of arrow B in FIG. 11(b).

Also, at this time, the second collar portion 128 is abutted against the side surface of the arm abutting portion 112a to move the reverse idler arm 112 in the same axial direction as the 5th-speed and reverse shift shaft 100. Owing to the movement of the reverse idler arm 112, the reverse shift lever 114 is oscillated, the reverse idler gear 84 is moved to the main reverse gear 28 side (see FIG. 7), and finally the reverse idler gear 84 is meshed with the main reverse gear 28 and the counter reverse gear 64 to complete the shifting.

As a result, in the selective slide type gear transmission, when in reverse shifting, the 1st and 2nd-speed shift shaft 92 is slightly moved in the axial direction upon initial rotation of the shift and select shaft 86, and rotation of the main shaft 10 is stopped before the reverse idler gear 84 is meshed with the main reverse gear 28 and the counter reverse gear 64 due to the cam mechanism 134 activating the synchronous meshing mechanism 68, whereby the reverse idler gear 84 is smoothly meshed with the main reverse gear 28 and the counter reverse gear 64, thereby effectively preventing generation of gear knocking sound.

Thus, in this embodiment, even in case the operational speed of the reverse shifting is high, the forward stage 1st and 2nd-speed synchronous meshing mechanism 68 is surely actuated to effectively prevent generation of gear knocking sound.

Upon shifting out of reverse, the cam part 130a engages the cam part 132a again (this time from the opposite side), but the spring 140 permits rotation of the shaft 86 relative to the cam 130, hence allowing the shift lever 90 and yoke 102 to return to the neutral position. When the shaft 86 is subsequently moved in its axial direction, the cams 130 and 132 become disengaged from each other and the spring 140 snaps the cam 130 back into its original rotational position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a transmission including a main gear shaft supported for rotation, a forward stage low speed shift shaft, a forward stage high speed shift shaft, a forward stage maximum speed and reverse shift shaft which is selectively moved axially or rotatably by actuation of a shift and select lever mounted on a shift and select shaft, and a gear knocking sound preventing device, the improvement wherein said gear knocking sound preventing device includes a cam mechanism having a first cam disposed on said shift and select shaft, a second cam disposed on said forward stage low speed shift shaft so that said second cam can be engaged with and disengaged from said first cam, and a first means coacting between said first cam and said shift and select shaft for permitting angular displacement of said first cam relative to said shift and select shaft about an axis generally parallel to said shift and select shaft, said first cam being activated in accordance with rotation of said shift and select shaft and being brought into engagement with said second cam during reverse shifting so that said forward stage low speed shift shaft is moved slightly in the axial direction to activate a forward stage synchronous meshing mechanism and thereby stop the rotation of said main gear shaft.

2. In a transmission including a main gear shaft supported for rotation, a forward stage low speed shift shaft, a forward stage high speed shift shaft, a forward stage maximum speed and reverse shift shaft which is selectively moved axially or rotatably by actuation of a shift and select lever mounted on a shift and select shaft, and a gear knocking sound preventing device, the improvement wherein said gear knocking sound preventing device includes a cam mechanism having a first cam disposed on said shift and select shaft, a second cam disposed on said forward stage low speed shift shaft so that said second cam can be engaged with and disengaged from said first cam, a first means coacting between said first cam and said shift and select shaft for permitting angular displacement of said first cam relative to said shift and select shaft, said first cam being activated in accordance with rotation of said shift and select shaft and being brought into engagement with said second cam during reverse shifting so that said forward stage low speed shift shaft is moved slightly in the axial direction to activate a forward stage synchronous meshing mechanism and thereby stop the rotation of said main gear shaft, a cam shaft attached to said forward stage low speed shift shaft, said second cam being supported on said cam shaft, and a second means coacting between said second cam and said cam shaft for permitting angular displacement of said second cam relative to said cam shaft.

3. A transmission according to claim 2, wherein said first means includes a first spring means connected between said first cam and said shift and select shaft for yieldably biasing said first cam into a first angular orientation relative to said shift and select shaft while simultaneously permitting said first cam to assume a second angular orientation relative to said shift and select shaft.

4. A transmission according to claim 3, wherein said second means includes a second spring means connected between said second cam and said cam shaft for yieldably biasing said second cam into a first angular orientation relative to said cam shaft while simultaneously permitting said second cam to assume a second angular orientation relative to said cam shaft.

5. A transmission according to claim 4, wherein said cam shaft projects generally radially outwardly from said forward stage low speed shift shaft in generally parallel relationship with said shift and select shaft, said second cam projecting generally radially from said cam shaft toward said shift and select shaft, and said first cam projecting generally radially from said shift and select shaft toward said cam shaft.

6. A transmission according to claim 5, wherein said first spring means includes a first coil spring which is coiled around said shift and select shaft, and wherein said second spring means includes a second coil spring which is coiled around said cam shaft.

7. In a transmission including a rotatably supported main gear shaft, an axially movably supported forward stage low speed shift shaft, an axially movable supported reverse shift shaft, a meshing means responsive to axial displacement of said forward stage low speed shift shaft for applying to said main gear shaft a retarding force which retards rotation thereof, means responsive to axial displacement of said reverse shift shaft for shifting the transmission into a reverse mode, and a movably supported shift and select shaft, the improvement comprising a gear knocking sound preventing means responsive to movement of said shift and select shaft for effecting simultaneous axial displacement of both said reverse shift shaft and said forward stage low speed shift shaft in order to retard rotation of said main gear shaft during reverse shifting, said gear knocking sound preventing means including a cam mechanism having a first cam supported on said shift and select shaft, and a first means coacting between said first cam and said shift and select shaft for permitting angular movement of said first cam relative to said shift and select shaft about an axis generally parallel to said shift and select shaft.

8. In a transmission including a rotatably supported main gear shaft, an axially movably supported forward stage low speed shift shaft, an axially movably supported reverse shift shaft, a meshing means responsive to axial displacement of said forward stage low speed shift shaft for applying to said main gear shaft a retarding force which retards rotation thereof, means responsive to axial displacement of said reverse shift shaft for shifting the transmission into a reverse mode, and a movably supported shift and select shaft, the improvement comprising a gear knocking sound preventing means responsive to movement of said shift and select shaft for effecting simultaneous axial displacement of both said reverse shift shaft and said forward stage low speed shift shaft in order to retard rotation of said main gear shaft during reverse shifting, said gear knocking sound preventing means including a cam mechanism having a first cam supported on said shift and select shaft, a first means coacting between said first cam and said shift and select shaft for permitting movement of said first cam relative to said shift and select shaft, a cam shaft attached to said forward stage low speed shift shaft, a second cam supported on said cam shaft, and a second means coacting between said second cam and said cam shaft for permitting movement of said second cam relative to said cam shaft, said first and second cams being positioned to engage with one another during movement of said shift and select shaft.

9. A transmission according to claim 8, wherein said first means includes a first spring means connected between said first cam and said shift and select shaft for yieldably biasing said first cam into a first position relative to said shift and select shaft while simultaneously permitting said first cam to assume a second position relative to said shift and select shaft.

10. A transmission according to claim 9, wherein said second means includes a second spring means connected between said second cam and said cam shaft for yieldably biasing said second cam into a first position relative to said cam shaft while simultaneously permitting said second cam to assume a second position relative to said cam shaft.

11. A transmission according to claim 10, wherein said cam shaft projects generally radially outwardly from said forward stage low speed shift shaft in generally parallel relationship with said shift and select shaft, said second cam projecting generally radially from said cam shaft toward said shift and select shaft, and said first cam projecting generally radially from said shift and select shaft toward said cam shaft.

12. A transmission according to claim 11, wherein said first spring means includes a first coil spring which is coiled around said shift and select shaft, and wherein said second spring means includes a second coil spring which is coiled around said cam shaft.

* * * * *